March 31, 1953 C. N. BEBINGER 2,633,232
SHAKER CONVEYER

Filed Dec. 11, 1946 6 Sheets-Sheet 2

Fig. 2

INVENTOR.
Charles N. Bebinger
BY
Stradling and Kroat
attys.

March 31, 1953     C. N. BEBINGER     2,633,232
SHAKER CONVEYER Filed Dec. 11, 1946     6 Sheets-Sheet 3

INVENTOR.
Charles N. Bebinger
BY
Woodling and Krost
attys.

March 31, 1953  C. N. BEBINGER  2,633,232
SHAKER CONVEYER
Filed Dec. 11, 1946  6 Sheets-Sheet 4

INVENTOR.
Charles N. Bebinger
BY
Woodling and Krost
attys.

March 31, 1953 C. N. BEBINGER 2,633,232
SHAKER CONVEYER
Filed Dec. 11, 1946 6 Sheets-Sheet 5

INVENTOR.
Charles N. Bebinger
BY
Woodling and Krost
attys.

March 31, 1953 C. N. BEBINGER 2,633,232
SHAKER CONVEYER
Filed Dec. 11, 1946 6 Sheets—Sheet 6

Fig. 10
Fig. 11
Fig. 12

INVENTOR.
Charles N. Bebinger
BY
Woodling and Krost
attys

Patented Mar. 31, 1953

2,633,232

UNITED STATES PATENT OFFICE 2,633,232

SHAKER CONVEYER

Charles N. Bebinger, New Philadelphia, Ohio, assignor to Joy Manufacturing Company, a corporation of Pennsylvania Application December 11, 1946, Serial No. 715,526

10 Claims. (Cl. 198—220)

My invention relates in general to shaker conveyors and more particularly to drive and mounting means, and angle turn drives therefor.

This application is a continuation in part application based on my application Serial No. 551,156, filed August 25, 1944, and now abandoned, for Shaker Conveyor, and on my application Serial No. 595,901, filed May 26, 1945, for Shaker Conveyor Drive Mounting, and now abandoned.

In the coal mining industry, as the thicker veins of coal are worked out, the equipment manufacturers are faced with the problem of producing mining equipment to meet the needs of "low coal." That is, conveyors must be provided to operate at a considerably lower level than heretofore possible in the thicker veins of coal. Shaker conveyors which are mounted on top of power units are becoming obsolete and unusable in the thinner veins. Further, the more compact a conveyor and drive therefor can be designed, the more efficient is its operation in the low coal veins. Therefore, any drive and mounting device which eliminates excessive bulk and area consumption within the mine, is a welcome innovation.

Further, although it is desirable even in large coal veins to eliminate the necessity of moving prime mover units back into the depths of the individual side corridors and rooms of the coal mine, it is particularly essential to eliminate heavy machinery from the side corridors in low coal veins. Accordingly, many types of angle turn drives have been developed. A large number of the angle turn drives are of the bell-crank type with one crank arm attached to the main trough and with the other arm attached to the branch trough, both pivoting around a fixed jack or pivot point. In operation, such bell crank construction which pivots about one point results in an arc-like motion for both the main and the branch troughs. The true straight line reciprocating motion which is imparted to the main trough at the shaker drive is accordingly distorted when it is transmitted through the bell crank angle turn drive to the branch trough. The reciprocating motion is likewise distorted in the main trough for a moderate distance away from the point where the bell crank is connected thereto but the flexibility of the main trough line due to section connections gradually eliminates the arc-like motion the closer the main trough line approaches the shaker drive where the main trough line is substantially confined to a straight line reciprocating motion. In shaker conveyors, the troughs are given a quick backward movement and a slow forward movement. Consequently, the material is conveyed in a forward direction because, during the instant of the highly accelerated backward movement, the trough merely passes under the material and, during the period of the slowly accelerated forward movement, the trough carries the material therewith. It is important that no snubbing or pressure means be applied to the trough line to interfere with the highly accelerated backward movement, such as the interference incident to the arc-like motion of a bell crank type of angle turn drive. In addition, specially prepared guiding means which tend to forcibly prevent the trough line from assuming an arc-like movement, acts to snub or interfere with the conveyor stroke.

An object of this invention is to provide a shaker conveyor drive with the power take-off point for attachment to the conveyor line so located as to permit the conveyor trough line to operate on the mine floor at a minimum overall height.

Another object of my invention is the combination of a support means and drive means whereby the shaker conveyor trough may be located relatively close to the ground.

Another object of my invention is to provide a power mechanism for a spring driven shaker conveyor, which power mechanism is rigidly maintained on a unit base and is provided with a power converting device to eliminate the transfer of extreme vibration to the shaker conveyor trough.

Another object of my invention is the provision of a motion converting and mounting means to drive a shaker conveyor trough line which permits the trough line to be maintained at a minimum overall height.

A still further object of my invention is the provision of a motion converting means to apply power to a shaker conveyor trough line, which motion converting means aligns the trough section without the use of auxiliary guiding means.

Another object of my invention is to form a support for the portion of a trough line adjacent a drive mechanism which eliminates trough guiding means for holding the trough in alignment with the drive, and to provide a simplified drive connection from the drive mechanism to the trough line which will efficiently drive the trough line even when the line pases the drive mechanism at a considerable angle of elevation.

Another object of my invention is the provision of bearing supports for a rock shaft drive mechanism placed for maximum support on the rock shaft with a minimum overall width.

Yet another object of the present invention is to provide an angle turn drive for a shaker conveyor system of such construction that the true straight line reciprocating motion of the main trough is imparted to the branch trough without distortion.

Another object of my invention is to convert the straight line reciprocating motion of the main trough into rotary motion, which rotary motion is, in turn, converted into a straight line reciprocating motion and applied to the branch trough.

Another object of my invention is to provide an angle turn drive between the main trough and the branch trough, whereby the branch trough may be shifted while the conveyor system is in motion or stationary.

A further object of my invention is the provision of forcibly shifting the branch trough constantly near to or into the coal which is being mined, and thus maintaining the branch trough at all times close to or under the coal to be mined, thereby making my system largely a self-feeding system thus avoiding shoveling.

Another object of the invention is to slidably support the branch trough upon a shaft comprising a part of the angle turn drive, whereby the branch trough may be shifted transversely in the longitudinal direction of the main trough while the conveyor either is in motion or idle but in all cases without disconnecting the branch trough from the main trough.

Other objects and a fuller understanding of my invention may be had by referring to the following description and claims, taken in conjunction with the accompanying drawing, in which:

Figure 1:
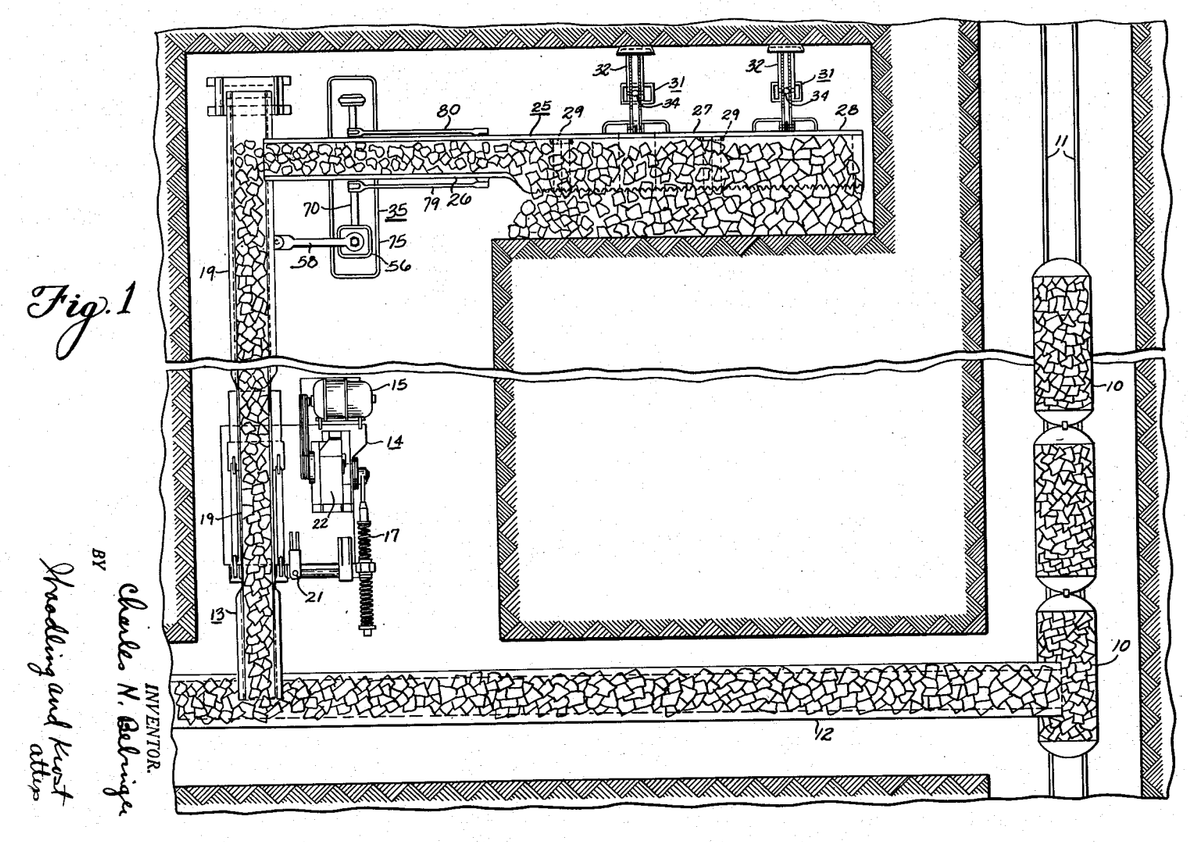
Figure 1 shows a fragmentary portion of a coal mine layout and illustrates my new and improved shaker conveyor system, showing my improved drive mounting on a unitary base structure and one illustration of my angle turn drive for driving a branch trough from the main shaker trough.

With reference to the Figure 1 of the drawing, I illustrate a fragmentary portion of a mine layout showing my conveyor system which is adapted to convey the coal or other material as it is mined to the mining cars which carry the coal or other material to the outside of the mine. The mining cars are indicated by the reference character 10 and the tracks upon which they run by the reference character 11. In the illustrated mine layout, the coal is delivered to the mining cars by means of a gathering conveyor 12 which may be in the form of an endless belt running on a plurality of spaced rollers. Coal is delivered to the gathering conveyor 12 by means of a main shaker trough 13 which is disposed substantially at right angles to the gathering conveyor 12. The main shaker trough 13 is made up of a number of trough sections indicated by the reference character 19. The main shaker trough 13 is driven by a shaker drive unit constructed in accordance with the principles of my invention and indicated generally by the reference character 22. The shaker drive unit 22 is in general similar to the drive mechanism illustrated in my Patent No. 2,337,174. All of the parts of the shaker drive unit 22 are mounted upon a single unit base 14 in order that all of the parts may be solidly mounted, and thus avoid shifting or relative movement therebetween. The unit base 14 may be easily dragged into position by means of a convenient pulling lug, and thereafter the entire base may be easily jacked down in the usual manner by a minimum number of jacks (not illustrated) with all the parts maintained in their proper relationship. The shaker drive unit embodiment of my invention is more specifically illustrated in the Figure 2 of the drawing. Coal is fed to the main shaking trough 13 by a branch trough 25 which is driven, in a true straight line shaking motion, by the main trough 13 by means of a motion transmitting mechanism indicated generally by the reference character 35. The branch trough 25 may comprise a plurality of sections 26, 27 and 28 properly secured together at a point indicated by the reference character 29 by means of connecting nuts and bolts or other suitable means. The sections 27 and 28 and a portion of the section 26 have a forward saw tooth cutting edge 30 arranged to cut under the coal as the sections are forced into the coal by means of shifting devices 31 which may be in the form of hydraulic or mechanical jacks. In the drawing, I have indicated a mechanical jack comprising a jack member 32 having ratchet teeth thereon and ratchet pawls 33, the forward one of which is operated by a lever 34. As the saw toothed edges are forced under the coal, the coal is then caused to move up the branch trough 25 under the action of the shaker movement and then fed into the main shaker conveyor 13.

The foregoing discussion in connection with Figure 1, is intended to set forth generally two adaptations of the present invention and to illustrate a method by which they might be employed in a mining situation. Having set forth this general scheme of mining and the illustrated adaptation of my invention, I believe it will be to advantage in describing and understanding of the present invention to discuss each separate portion individually and explain its function.

Figure 2:
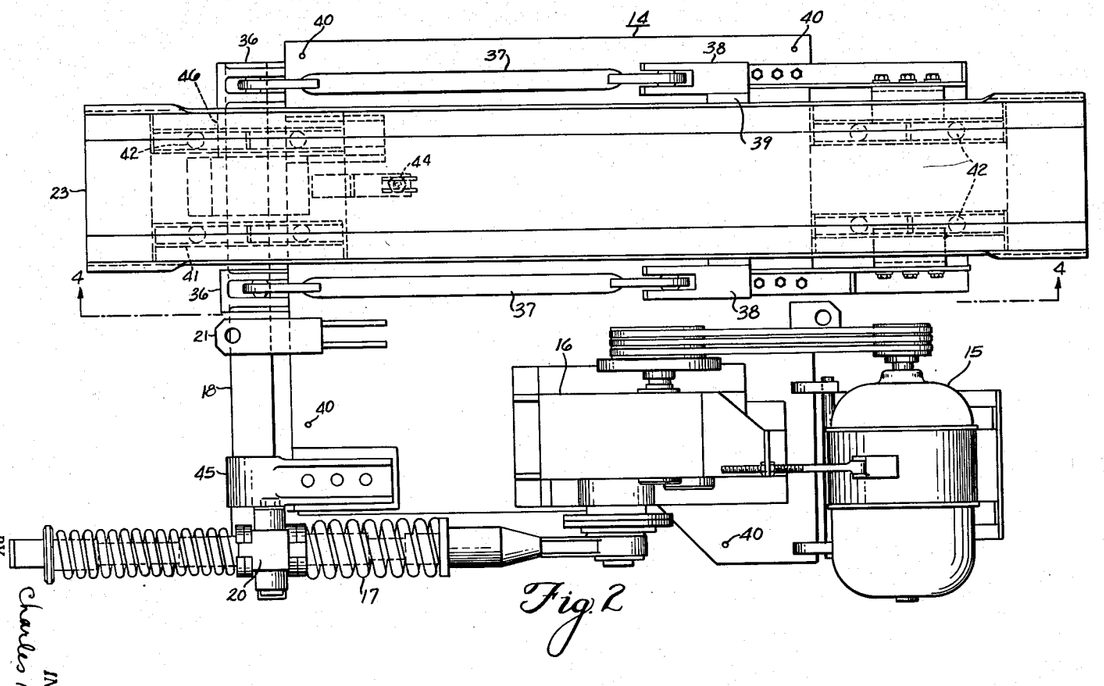
Figure 2 is a plan view of my improved drive and motion converting means, showing the rock shaft upon which the trough is mounted and the interconnecting means between the rock shaft and the trough section.
Figure 3:
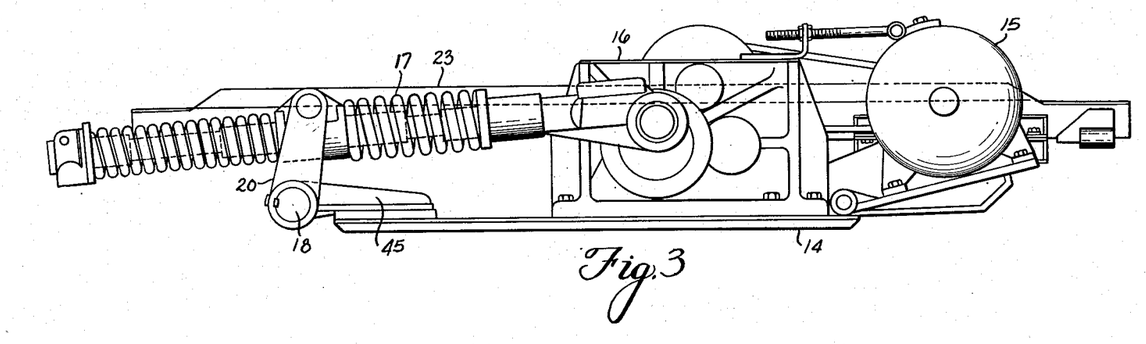
Figure 3 is a side view of Figure 2.

Accordingly, reference is now made to the Figure 2 of the drawing in which the shaker drive unit 14 is illustrated more specifically. In the Figure 2, I illustrate a motor 15 driving a gear mechanism 16, which gear mechanism in turn operates a spring drive mechanism 17 as illustrated in my Patent No. 2,337,174. The spring drive mechanism 17 is interconnected to a rock shaft 18 by means of a lever arm 20 and is disposed to operate the rock shaft 18 with a rocking motion about its longitudinal axis. As before stated, all of the drive mechanisms, including the spring drive mechanism 17 and the rock shaft 18, are mounted upon a single unit base 14 in order that all the parts may be solidly mounted. A pulling lug 21 is provided to conveniently pull the unit base 14 into operative position. Thereafter, the entire base may be easily jacked down in the usual manner, and holes 40 are provided in the base 14 to allow the jack points to extend therethrough and enter the mine floor.

A trough 23 which is a section of an entire trough line, is driven from the rock shaft 18 by means of rocker arms 36 and connecting arms 37. The rocker arms 36 are secured tightly to the rock shaft 18 and the connecting arms 37 extend from the rocker arms 36 to a point removed therefrom. The connecting arms 37 may be connected to the trough 23 by any suitable means, such as by the connecting lug 38. The connecting lug 38 is illustrated as being an integral part of a cross member 39, but may be either welded or secured thereto by a pin if desired. Thus, it will be seen that rocking motion of the rock shaft 18 will cause the rocking arm 36 to swing from side to side and push and pull the connecting arm 37 to cause a reciprocating or shaking motion of the trough 23 and the entire trough line. The connecting arms 37 prevent a vertical moving of the trough 23; that is, the point at which the connecting arms 37 are connected to the rocking arms 36 will move about a semicircular path and thus be raised and lowered vertically in relation to the horizontal plane of the trough 23. Therefore, it is not practical, when true straight-line motion is desired, to connect the trough 23 directly to the rocker arm 36. Rather, the trough 23 is connected to the rocker arms 36 by the connecting arms 37 in order that the shifting of height at one end of the connecting arms 37 will be hardly perceptible at the point of connection at the connecting lugs 38. Therefore, the driving force applied to the trough 23 will be, for all intents and purposes, directly in a horizontal plane with the direction of movement of the trough 23.

Figure 4:
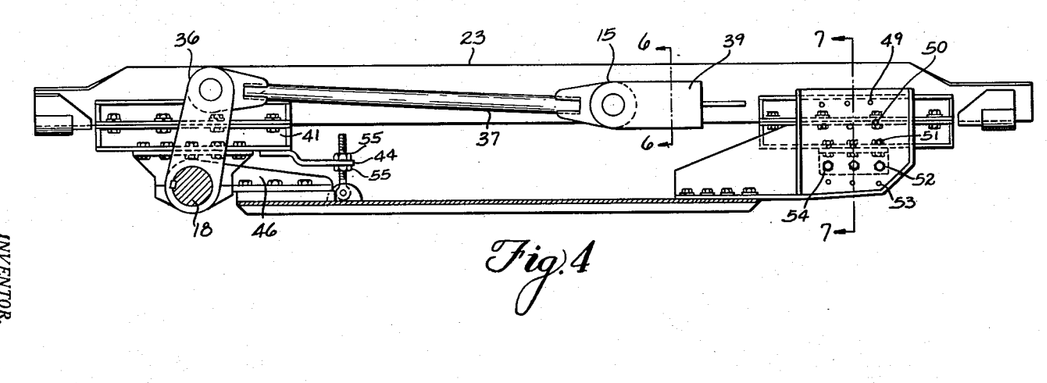
Figure 4 is a cross-sectional view along the line 4—4 of Figure 2, and illustrates the connection between the rock shaft and the trough section.

In order to accomplish the object of placing the trough 23 as low as possible in relation to the mine floor, I have provided a mounting means to mount the trough 23 at the point at which it crosses the rock shaft 18. This mounting comprises a ball frame 41 comprising two frames to serve as ball races and employing balls 42 therein. The ball frame and trough are pivotally mounted upon the rock shaft 18 by means of a collar 43. A steadying means for the ball frame 41, as illustrated in the Figure 4, is provided by an adjusting means 44, which may be adjusted about the longitudinal axis of the rocking shaft 18 in order to comply with any positioning of the trough 23. That is, the trough 23 may be elevated or lowered at a distant point relative to the drive area in order to follow the level of the vein of coal and the ball frame 41 will be adjustable to align therewith.

In the type of drive illustrated in the drawing, as well as most known types of reciprocating drives, a severe endwise force is applied by the drive mechanism in a very short period of time. If this force were applied directly to the reciprocating trough 23, an exceedingly heavy connecting means would be required to withstand the extreme shock delivered. Even so, fatigue would ultimately cause failure of the connecting part. My invention contemplates the absorption of the extreme end thrust and the conversion of these end thrusts into rotary reciprocating motion which may be conveniently converted into straight-line reciprocating motion for use in driving the trough line. It will be noted, in the Figures 2 and 5, that the rock shaft 18 is mounted upon the base 14 by means of two bearing members 45 and 46. The bearing members 45 and 46 are preferably mounted at the edge of the unit base 14 as illustrated, and allow the rock shaft 18 to be placed with the minimum of space between the rock shaft 18 and the bottom of the mine floor. The placement of the rock shaft 18, as nearly in a straight-line relationship with the base as possible, reduces the lever arm between the center of rotation of the rock shaft 18 and the base 14, whereby the tendency for rocking and vibration of the entire drive mechanism and base is reduced to a minimum. Also, the placement of the rock shaft 18 in the described position permits the trough 23 to be placed as low as possible towards the mine floor.

Figure 7:
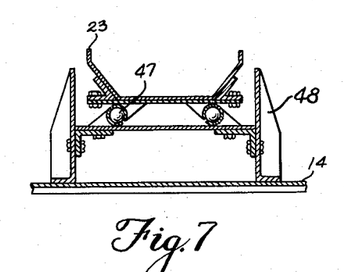
Figure 7 is a cross-sectional view taken along the line 7—7 of Figure 4.

In the Figure 7, I illustrate a type of ball frame support 47 which may be used as another support point along the base 14 other than at the described position upon the rock shaft 18. It will readily be understood that the height of the trough 23 at the point at which it passes over the rock shaft 18 will be the controlling factor in the height to which the trough 23 will be supported at other points along its line. That is, by eliminating the prior art methods of supporting the trough 23 above complicated drive units at a considerable height, the remainder of the supports, such as the illustrated ball frame 47, may also be placed at a relatively low height. The net result of this method of mounting as illustrated in connection with the rock shaft 18, is a trough line which may operate at low levels to accommodate the coal in narrow veins. The frame 48 is also illustrated in the Figure 7, and comprises substantially two upright structural members having a series of bolt openings therein. These series of bolt openings are illustrated by the reference characters 49, 50, 51, 52 and 53 in the Figure 4. Bolts 54 extend through the openings 52 in the illustration, and may be removed and placed in any of the other series of openings to support the trough 23 at a different elevation. Each of these series of openings is illustrated as comprising three openings, but may comprise more or fewer as desired. The openings of each series are aligned with one another in a straight-line relationship and are on a straight-line relationship with the center of the rock shaft 18. That is, the openings fall upon an arc struck from the center of the rock shaft 18. Thus, the bolts 54 may be removed from the openings 52 and the ball frame 47 raised or lowered to any one of the other series of openings to incline the trough 23 at any desired angle with respect to the drive mechanism and base. Thus, if the bottom of the mine is sloped either on the upgrade or downgrade from the base 14, the trough 23 can be tilted to travel substantially parallel with the mine floor. As before described, the connecting arm 37 will remain in substantially the same relationship with the trough 23 regardless of the amount of tilting of the trough 23 to produce straight-line reciprocating movement therein. However, the ball frame adjusting means 44 will need to be adjusted to correspond to any change in the angle of the trough 23. This is easily accomplished by loosening one of the adjusting nuts 55 on the adjusting means 44 to allow free movement of the ball frame 41 during the movement of the trough 23. Thereafter, the nut 55 may be tightened down to again serve as a steadying means. The nut 55 may thereafter be again loosened and moved in either direction to adjust the ball frame 41 a small amount. However, the adjusting means 44 serves its largest function in causing the ball frame 41 to remain steady upon the rock shaft 18 and resist any impulse to rock along with the rock shaft 18 instead of floating thereon.

The rocker arms 36, it will be noted in the Figure 2, are placed substantially equidistantly from the center line of the trough 23 in order that the trough 23 will be guided in a direction parallel to the direction of oscillation by applying power evenly to both sides of the trough 23. Former devices have attempted to place the driving unit of a shaker conveyor to one side in order that a low overall height may be obtained for low vein coal. But, these devices usually have applied the power to only one side of the trough line or, at a permanently fixed point on the bottom of the trough line. It has been found, that by these prior art devices, an uneven drive is usually supplied to the trough, and thereby require a guiding means to keep the trough in a straight-line reciprocating movement. This usually requires arrangements that create a heavy friction in the operation of the unit and consume excessive power. My device, on the other hand, is so constructed that relative adjustments of the lug 38 and the rocking arms 36 will exactly position the connecting arms 37 to place them substantially equidistantly from the center line of the trough 23. Further, by securely fastening the rocker arms 36 to the rock shaft 18, equal driving power will be supplied at each side of the trough 23. Also, by connecting the trough 23 to the rock shaft 18 in the described manner, the trough 23 may be shifted vertically relative to the driving mechanism without affecting its efficient drive. That is, the connecting arms 37 will move with the trough 23 and provide substantially the same driving relationship regardless of position.

Figure 5:
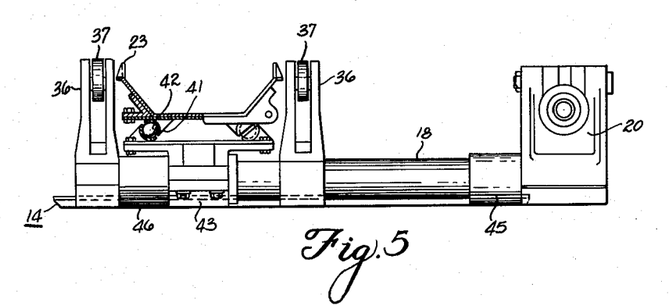
Figure 5 is an end view of Figure 2 with parts of the trough in section, and illustrating the mounting of the trough upon the rock shaft.
Figure 6:
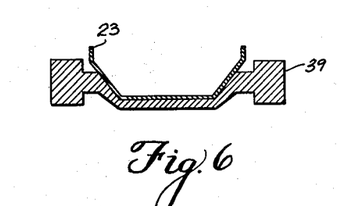
Figure 6 is a cross-sectional view taken along the line 6—6 of Figure 4.

Note, in the Figure 5, that the bearings 45 and 46 are positioned to support the rock shaft 18 with a minimum occupation of lateral space, yet providing adequate support. That is, the bearing 45 is placed between the lever arm 20 and a rocker arm 36, and the bearing 46 is placed between the two rocker arms 36. More specifically, the bearing 46 is preferably placed between the collar 43 and the rocker arm 36 furthest removed from the lever arm 20. Thus, the rock shaft 18 may be limited in length to the minimum required for operation.

Although it is entirely possible, and in some instances desirable, to operate each branch trough line from an individual power source as described, there are many instances in which it is impractical to carry the heavy power equipment back into the individual mine rooms, and therefore it is desirable to have some other means of driving branch troughs. As pointed out in the preliminary discussion, my improved motion transmitting mechanism 35 has been developed primarily for this purpose of driving branch troughs from the motion of the main trough.

Figure 8:
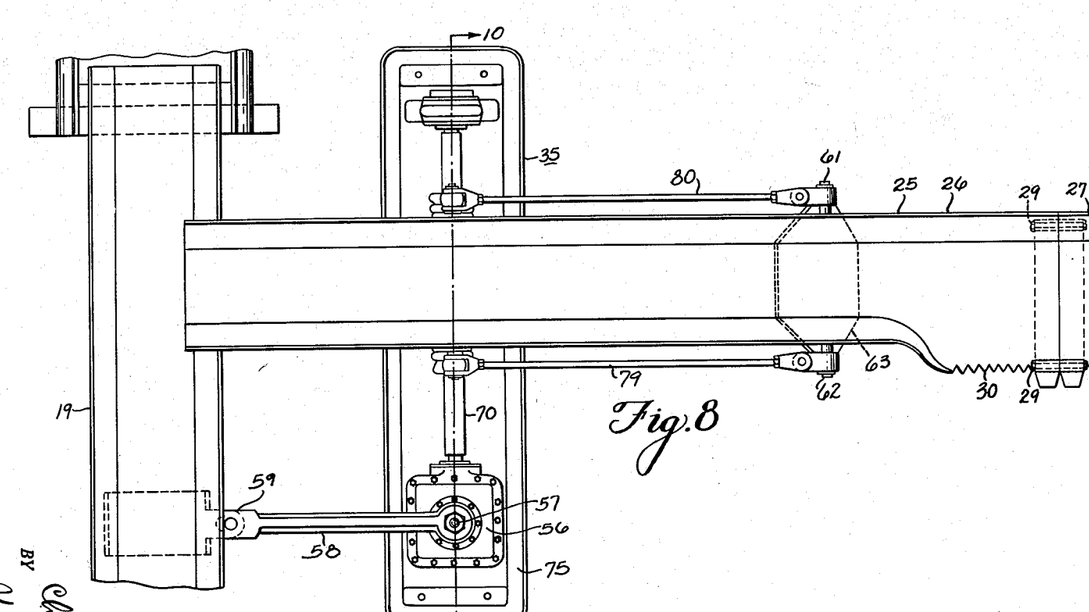
Figure 8 is a fragmentary view of a main trough and a branch trough, together with my angle turn drive which transmits the straight line reciprocating motion of the main trough to the branch trough without distortion.
Figure 9:
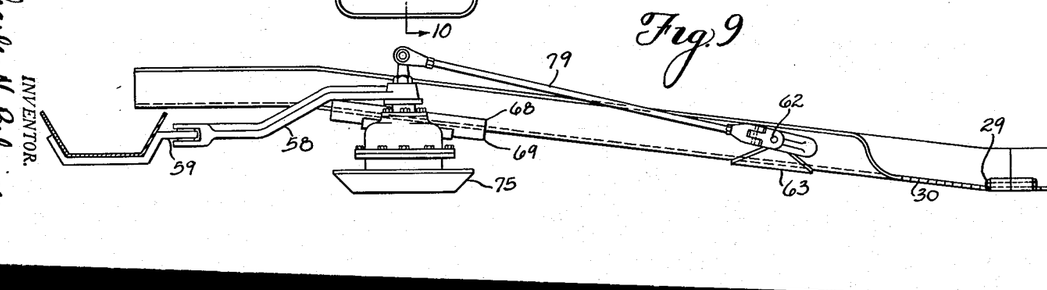
Figure 9 is a side elevational view of the structure shown in Figure 8 with the main trough shown in cross section and with the supporting stand omitted.
Figure 10:
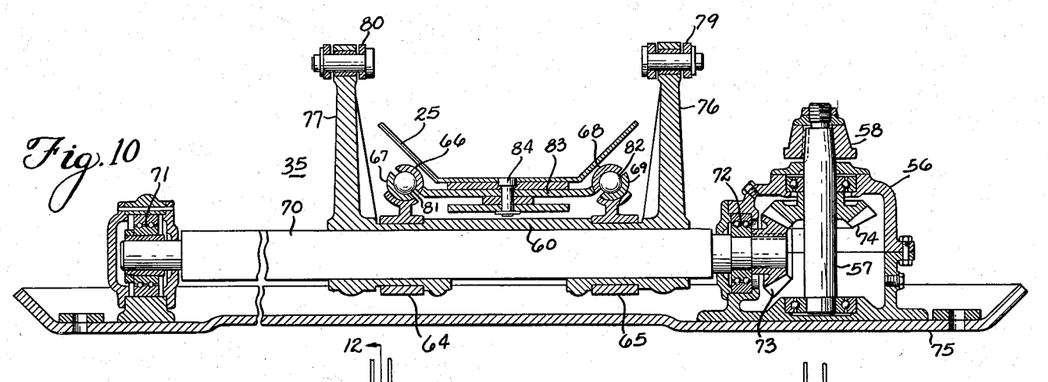
Figure 10 is an enlarged cross-sectional view taken along the line 10—10 of Figure 8.

The general appearance and relationship to the remainder of the mine equipment is shown in the Figure 1, but the motion transmitting mechanism is more completely illustrated in the large views in Figures 8, 9 and 10 and comprises a unit base 75 upon which is mounted a rocking shaft 70 driven by a gear assembly indicated by the reference character 56. In Figure 10, the left-hand end of the rocking shaft 70 is supported by a bearing 71 and the right-hand end is supported by a bearing 72. The right-hand end of the rocking shaft extends beyond the bearing 72 and is provided with a bevel gear 73 which meshes with a driven bevel gear 74 carried by a vertical shaft 57 in the gear case housing. The upper end of the vertical shaft 57 is actuated by a lever 58 which is driven by the main shaking trough 13. The left-hand end of the lever 58 may be slidably and pivotally connected to the main trough 13 by means of a bracket 59, as illustrated best in the Figure 8, suitably anchored to the bottom of the trough 13 and having a slotted side portion to which the connecting rod may be connected by a suitable pivot pin. As the left-hand end of the conecting rod 58 is actuated back and forth under the reciprocal straight line movements of the main shaking trough 13, motion is transmitted to the vertical shaft 57 for rocking the gears 73 and 74, which in turn actuate the shaft 70 for driving the branch trough. I have found it very desirable, as in the case with the main power driven mechanism as previously described, to place the gear assembly 56 and the rocking shaft 70 with the bearings 71 and 72 upon a unit skid base for virtually the same reason set forth for providing the unit base 14.

Sildably mounted upon the shaft 70, which is preferably square, is a sleeve 60 which is provided with spaced rocking arms 76 and 77 which drive the branch trough 25 through side connecting rods 79 and 80, which are connected to each side of the branch trough to equally distribute the load to insure a straight-line motion being imparted to the branch trough. In other words, the rocking arms 76 and 77 have non-rotative interlocking surfaces with the rocking shaft 70. As shown in Figure 8, the right-hand end of the connecting rods 79 and 80 are connected to side pivot pins 61 and 62 carried by a bracket 63 mounted to the underneath side of the branch trough 25 in a manner similar to the mounting of the cross member 39 in Figure 2. Accordingly, the straight-line reciprocal motion of the main shaker trough 13 is converted into rotary motion, which rotary motion is, in turn, converted into straight-line reciprocating motion for driving the branch trough 25. The shaft 70, as before stated, is preferably square, but it may be round and provided with a longitudinal key way so that the slidably mounted sleeve 60 turns therewith for actuating the branch trough 25. In other words, whether the shaft 70 be provided in square form or be round and provided with a longitudinal key way, the sleeve 60 is shiftable relative to the rock shaft 70, but is locked with the shaft 70 to rock with the shaft. Mounted around the sleeve 60 at spaced distances apart and inside the two rocking arms 76 and 77 are two collars 64 and 65 which support a suitable reciprocating carriage for carrying the branch trough 25. In the illustration, the reciprocating carriage is of the ball type, but it is understood that any suitable carriage operating in a similar manner may be employed. The ball type carriage illustrated comprises two substantially semi-circular longitudinal members 66 and 67 between which a plurality of balls or rolling elements 81 operate, and two other substantially semi-circular longitudinal members 68 and 69 between which a plurality of balls or rolling elements 82 operate. The members 67 and 69 are supported respectively by the collars 64 and 65, and the members 66 and 68 are connected by a bridge member 83 which carries the branch trough 25. As illustrated, the branch trough 25 is pivotally connected to the bridge member 83 by means of a suitable pivot construction 84.

The sleeve 60 is slidably movable upon the square shaft 70 so that the branch trough 25 may be shifted bodily transversely in the longitudinal direction of the main shaker trough 13 as the jack or shifting devices 31 force the saw tooth sections into the coal to be mined, making my system largely a self feeding system thus avoiding shoveling. Accordingly, my motion transmitting means or mechanism 35 makes it possible to shift the branch trough 25 while the conveyor system is either in motion or idle, but in all cases without the disconnection of the branch trough from the main trough 13. The length of the square shaft 70 is such as to permit lateral movement of the branch trough a distance substantially equal to at least approximately the depth of a cut of coal by a mining machine cutter bar.

Figures 11, 12:
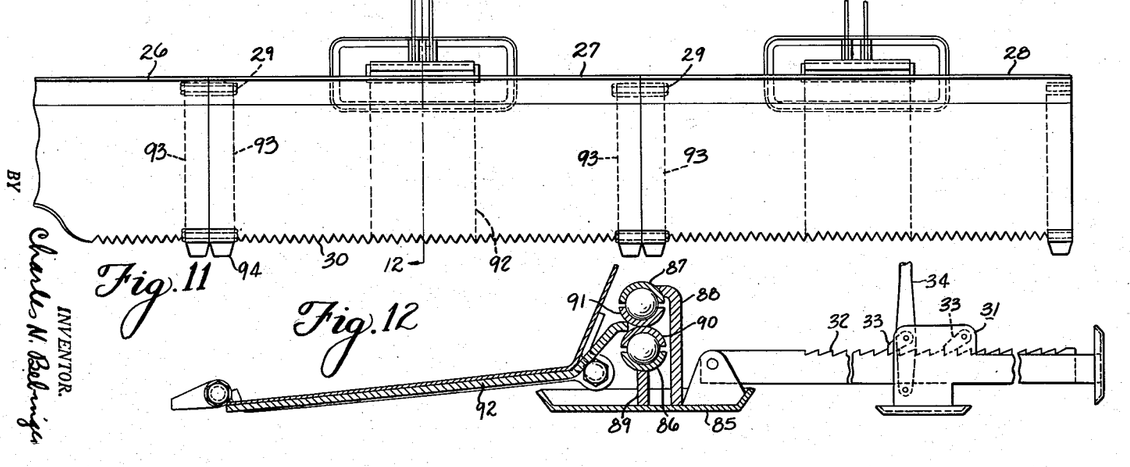
Figure 11 is an enlarged view of the branch trough which has saw teeth along its forward edge to work its way under the coal which is being mined.
Figure 12 is a cross-sectional view taken along the line 12—12 of Figure 11.

The back side of the saw toothed sections 27 and 28 is carried by a ball type reciprocating carriage supported by a skid base 85. As shown in Figures 11 and 12, the ball type carriage comprises a lower and an upper substantially semi-circular longitudinal members 86 and 87 supported respectively from the skid base 85 by vertical members 89 and 88. Intermediate the two substantially semi-circular members 86 and 87 are two oppositely disposed semi-circular longitudinal members 90 and 91. A plurality of balls or other rolling elements are disposed to operate between the two semi-circular members 87 and 91 and a plurality of balls or other rolling elements are disposed to operate between the two semi-circular members 86 and 90. Welded or otherwise suitably attached to the two intermediate semi-circular members 90 and 91 is a forwardly extending support bracket 92 which is fastened to the underneath side of a saw toothed trough section and which provides a means whereby the trough section may be reciprocated upon the balls of the ball type carriage. Each jack or shifting device 31 has one of its ends connected to the skid base 85.

The base plate or skid of the jack or shifting device 31 is held down against the floor of the mine by vertical jacks extending between the roof of the mine and the base plate. This downward force holds the base plate firmly in place, so that when the lever 34 is actuated the skid base 85 is pushed inwardly towards the coal. The saw toothed sections are connected together by means of attachment plates 93 which are secured or welded to the ends of the trough sections. The plates are fastened together in a side-by-side relation by the bolts and nuts 94 which assist in guiding the saw toothed sections under the coal as the shifting device 31 forces the saw toothed section under the coal. The angle of the tilt of saw toothed sections is kept at a low minimum by the construction of the ball type carriage mounted on the skid base 85. The minimum angle of tilt of the saw toothed sections makes it easy for the shifting devices to force the sections under the coal and avoid packing the coal against the trough which interferes with the proper conveyance of the coal by the shaking action.

Concurrently with the shifting of the saw toothed sections into the face of the coal, the sleeve 60 moves along the shaft 70, giving complete freedom to the shifting of the branch trough 25 while the conveyors are in motion without disconnecting the branch trough from the main trough. As the saw toothed sections are forced into the face of the coal, the shaking motion of the branch trough causes the coal to work its way up the trough where it is delivered to the main branch 13. My branch trough is substantially self feeding and thus avoids shoveling.

Although I have described by invention in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A conveying device comprising a longitudinally reciprocable shaking trough, a base, a rock shaft, means for supporting the rock shaft on the base, means to rockingly drive said shaft, actuating means drivingly interconnecting the rock shaft and the trough, and means having a bearing supported by said shaft coaxial with the latter for supporting the trough on the shaft for reciprocating movement in a direction transverse to the longitudinal axis of the said shaft.

2. A conveying device comprising a longitudinally reciprocable shaking trough, a skid base, a shaft, bearing means for mounting the shaft upon the skid base, means including reciprocating mounting means for supporting the trough on the shaft, pivot means for connecting the trough to the reciprocating mounting means, actuating means interconnecting the shaft and the trough for reciprocating the trough, and means for slidably mounting the reciprocating mounting means on the said shaft.

3. A drive unit to reciprocably drive a shaker conveyor trough line, comprising in combination, a unit base, a rock shaft bearinged on said base, a spring connected drive mechanism including a lever arm on said rock shaft to drive said shaft with a rocking motion, a section of said trough line extending along said unit base, mounting means including a first and second ball frame to mount the said section for reciprocable movement with respect to said base, said first ball frame and a mounting therefor being supported on said rock shaft to support one point of said section, and said second ball frame being adjustably mounted on said unit base to support a second point of said section, said first ball frame mounting comprising bearing means bearinged on said rock shaft, whereby the said ball frame may be supported in a substantially fixed position as the rock shaft is driven, said adjustable ball frame mounting comprising a support member adapted to support a ball frame in any one of a series of positions relative to said base to permit the said trough section to be sloped in like position relative to said base, and motion converting means including two rocker arms positioned substantially equidistantly from the center line of said trough section and secured to said rock shaft and disposed to be swingably driven by the rocking motion of said rock shaft, and extension arms pivotally secured to said two rocker arms and extending to a point removed from said two rocker arms and fastened to said trough section to reciprocably drive the trough section from the rocker arms.

4. In a shaker conveyor trough reciprocably driven by a rock shaft and motion converting means interconnecting the said trough and shaft, the provision of a low mounting for said trough, said low mounting comprising a ball frame supported on said rock shaft by bearing means on said shaft, means for supporting the trough on the said ball frame, and adjustable means to pivotally adjust said ball frame about the longitudinal axis of the said rock shaft, said adjustable means also serving as steadying means, whereby the ball frame remains substantially steady while being supported by the rock shaft by said bearing means.

5. A conveying device comprising, in combination, a longitudinally reciprocable shaking trough, an oscillatory drive shaft, trough supporting and guiding means including a guideway reciprocably supporting said trough and having a mounting upon said oscillatory drive shaft including a member providing a bearing surface coaxial with said drive shaft and within which the latter is oscillatable on its own axis, and trough driving means supported by said shaft and secured to the latter for turning therewith.

6. A conveying device comprising a longitudinally reciprocable shaking trough, drive means to impart reciprocating movement to the trough, said drive means comprising a driven shaft and actuating means interconnecting the shaft with the trough for reciprocating the latter, and mounting means supported on said shaft and relative to which said shaft is rotatable and said trough is reciprocable for supporting the trough on said shaft for reciprocating movement, said mounting means including relatively reciprocable elements one connected to said trough and supporting the latter and the other constituting a support for the first and supported upon said shaft.

7. A conveying device comprising a longitudinally reciprocable trough, driving means for driving said trough including a rocking shaft, actuating means drivingly interconnecting the rocking shaft and the trough for reciprocating the latter by motion received from the former, and means for supporting the trough upon the rocking shaft extending the trough in a longitudinal direction transverse to the longitudinal axis of the rocking shaft, said supporting means including a guideway reciprocably supporting said trough and having a mounting upon said shaft including a member providing a bearing surface coaxial with said shaft and relative to which the latter rocks and said actuating means and said rocking shaft having mutually engaging surfaces extending lengthwise thereof precluding relative rotary motion between them and said actuating means being longitudinally shiftable relative to said rocking shaft while said surfaces lock said actuating means to rock with said shaft.

8. A conveying device comprising, in combination, an oscillatory drive shaft, means for supporting the same for oscillation on its axis, a sleeve slidably supported on said shaft for movement longitudinally of the latter, said sleeve and shaft having surfaces for transmitting rocking motion from said shaft to said sleeve, said sleeve having bearing surfaces thereon concentric with said shaft, support means rotatably receiving, and supported on, said bearing surfaces, a reciprocating trough, guiding and supporting means for said trough mounted on said support means, and trough reciprocating connections driven from said sleeve.

9. In a shaker conveyor angle drive, a driving trough, a driven trough section arranged at an angle with respect to the driving trough and arranged to feed material thereto, and driving means for driving said driven trough from said driving trough including first motion transmitting means connected to the driving trough and driven thereby and second motion transmitting means connected to the driven trough for driving same, and gear means common to both said motion transmitting means for transmitting motion therebetween, said second motion transmitting means including a rocking shaft, and means for reciprocably supporting the driven trough upon the rocking shaft with its bottom at a fixed distance above the axis of said shaft.

10. In a shaker conveyor angle drive, a driving trough, a driven trough arranged at an angle with respect to the driving trough and arranged to feed material thereto, and driving means for driving said driven trough from said driving trough including first motion transmitting means connected to the driving trough and driven thereby and second motion transmitting means connected to the driven trough for driving same, and gear means for transmitting motion between said motion transmitting means, said first motion transmitting means including a rocking shaft and swinging arm means connecting the driving trough and the rocking shaft, said second motion transmitting means including a rocking shaft and swinging arm means connecting the rocking shaft and the driven trough section, and mutually engaged gears fixed one to each of said rocking shafts for connecting said rocking shafts together.

CHARLES N. BEBINGER.

REFERENCES CITED

The following references are of record in the file of this patent:

UNITED STATES PATENTS

| Number | Name | Date |
| --- | --- | --- |
| 2,123,189 | Jacobsen | July 12, 1938 |
| 2,284,718 | Bergmann | June 2, 1942 |
| 2,314,009 | McCarthy | Mar. 16, 1943 |
| 2,314,786 | Holstein | Mar. 23, 1943 |
| 2,327,305 | Hagenbook | Aug. 17, 1943 |
| 2,337,174 | Bebinger | Dec. 21, 1943 |
| 2,399,073 | Tibbals | Apr. 23, 1946 |